United States Patent
Scheinert et al.

(10) Patent No.: US 7,729,697 B2
(45) Date of Patent: Jun. 1, 2010

(54) PRIVATE BASE STATION WITH EXCLUSIVITY

(75) Inventors: Stefan Scheinert, San Diego, CA (US); Harold Grant Saroka, Ashburn, VA (US); Legohu Mogodi, Atlanta, GA (US); Daniel M. Bender, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 577 days.

(21) Appl. No.: 11/016,342

(22) Filed: Dec. 17, 2004

(65) Prior Publication Data

US 2007/0054668 A1 Mar. 8, 2007

Related U.S. Application Data

(63) Continuation-in-part of application No. 10/280,733, filed on Oct. 25, 2002, now Pat. No. 7,117,015.

(60) Provisional application No. 60/531,887, filed on Dec. 22, 2003.

(51) Int. Cl.
*H04Q 7/20* (2006.01)
(52) U.S. Cl. .................... 455/435.1; 370/328
(58) Field of Classification Search ............ 370/32 G, 370/335, 340; 709/224
See application file for complete search history.

(56) References Cited

U.S. PATENT DOCUMENTS

2001/0046215 A1* 11/2001 Kim ..................... 370/329
2006/0030313 A1* 2/2006 Massie et al. ........... 455/432.1
2006/0184667 A1* 8/2006 Clubb et al. ............. 709/224

FOREIGN PATENT DOCUMENTS

| JP | 2001/197557 | 1/2000 |
| JP | 2000/134663 | 5/2000 |
| JP | 2000/253441 | 9/2000 |
| JP | 2001/285924 | 10/2001 |
| JP | 2002/315058 | 10/2002 |

OTHER PUBLICATIONS

Notice of Allowance for GB Patent Application No. GB0610524.1 mailed Jun. 24, 2008, 1 pg.
Grant Notice for Korean Patent Application No. 10-2006-7012310 mailed Aug. 8, 2008, 3 pgs.
JPO, "42P22418JP Office Action Mailed Oct. 21, 2008 for JP Patent 2006-545490", Oct. 21, 2008, Whole Document.

* cited by examiner

*Primary Examiner*—Lester Kincaid
*Assistant Examiner*—Phuoc Doan
(74) *Attorney, Agent, or Firm*—Blakely, Sokoloff, Taylor & Zafman LLP

(57) ABSTRACT

A private base station (PBS) configured to connect to the Internet and establish a small area of wireless coverage includes an exclusivity database allowing registered mobile phones to use services within the cell and not allowing use of the services by unregistered mobile phones.

18 Claims, 2 Drawing Sheets

Block diagram of devices and processes required to implement Exclusivity in a wireless carrier network with a Private Base Station

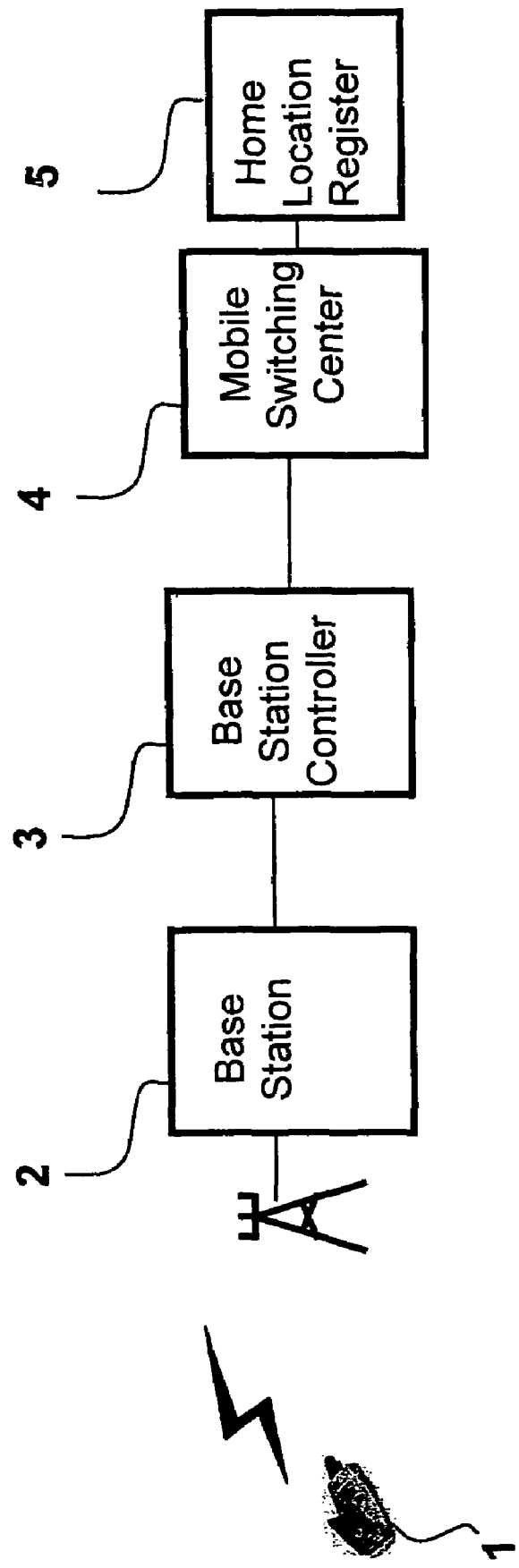
Figure 1: Block diagram of devices employed within a conventional wireless carrier network

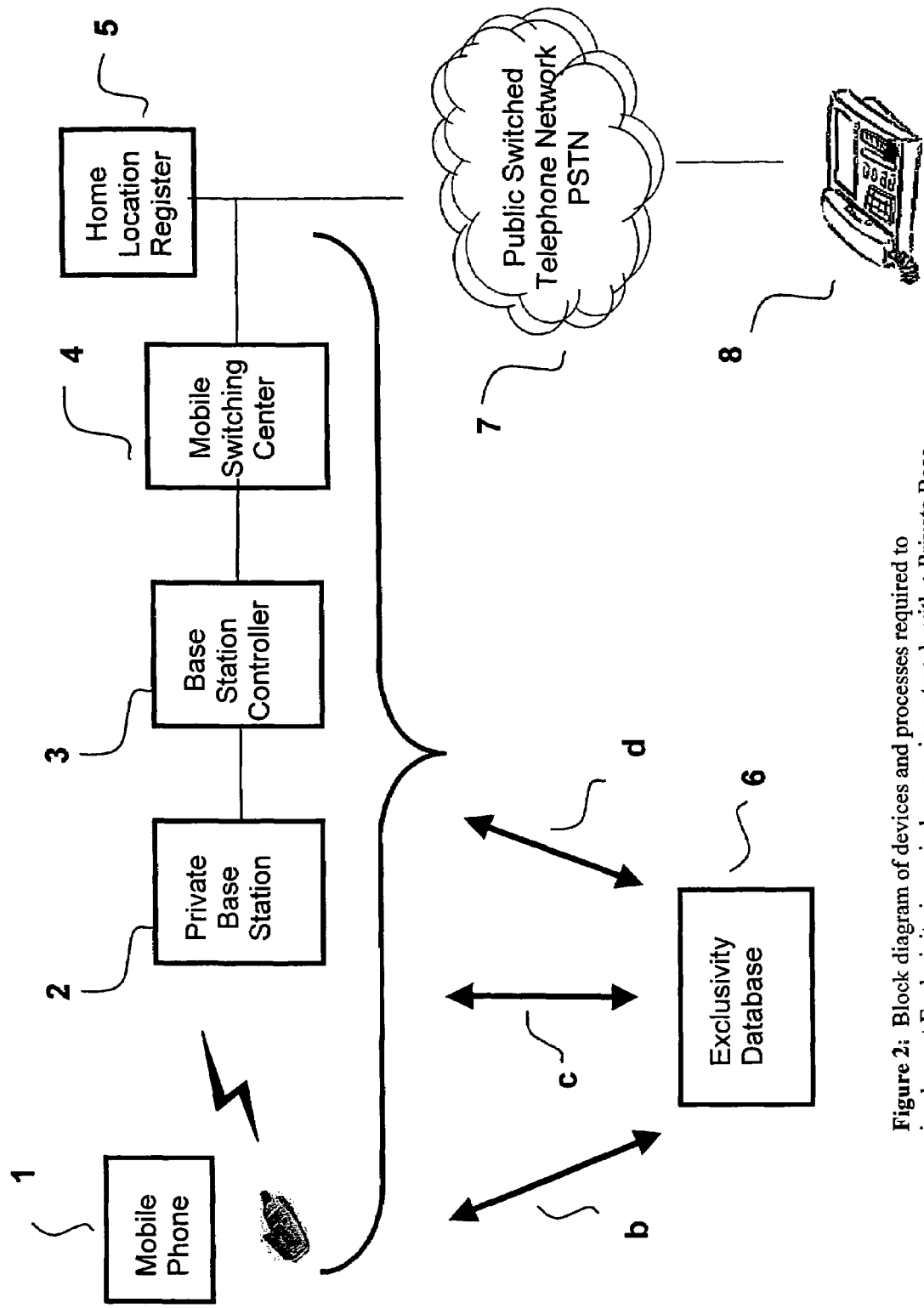
Figure 2: Block diagram of devices and processes required to implement Exclusivity in a wireless carrier network with a Private Base Station

PRIVATE BASE STATION WITH EXCLUSIVITY

RELATED APPLICATIONS

This application claims the benefit of U.S. provisional application No. 60/531,887, filed Dec. 22, 2003. This application is a continuation-in-part of U.S. non-provisional application Ser. No. 10/280,733, filed Oct. 25, 2002 now U.S. Pat No. 7,117,015.

FIELD OF THE INVENTION

The present invention relates generally to radio or wireless communications and, more particularly, to a personal or private base station that supports exclusivity. Exclusivity is the ability to grant or deny selected mobile phones access to services from a specific (designated) base station.

BACKGROUND OF THE INVENTION

In conventional wireless communication networks, it is unnecessary to provide exclusivity or deny selected mobile phones access to services from any specific (designated) base stations within carrier owned or roaming enabled networks. This is because the base station is typically owned by the carrier and designed to serve all authorized (registered) mobile phones within the base station cell area. However, once a carrier introduces privately owned base stations into a network, exclusivity may be required. Personal or Private Base Station (PBS) owners providing carrier services may be concerned that their limited base station bandwidth capacity is inadequate to meet the communication needs of all mobile users within their Private Base Station cell area. PBS owners may want to restrict the use of their Private Base Station(s) to selected mobile subscribers of their choice within the confines of specific areas, such as their own homes or businesses. Therefore, the concept of exclusivity represents a heretofore unaddressed need in the wireless communications industry.

A mobile phone, when switched on or changing locations may either be granted or denied service by the carrier network. The carrier may deny service to the mobile phone for various reasons, such as late subscription payment, lack of roaming privileges, and numerous other reasons. The elements employed within a conventional telecom wireless network architecture serving many mobile phones is illustrated in FIG. 1, and the conventional service permission/denial procedure is described below.

A mobile phone [1], when switched on or changing locations, initiates a location update procedure to find a control channel within a (previous or new) cell location that it is allowed to monitor (camp on). The mobile [1] begins the procedure by sending a Location Updating Request (LUR) to the Base Station (BS) [2], which is then forwarded to the Base Station Controller (BSC) [3]. The BSC then sends the LUR to the Mobile Switching Center (MSC) [4]. The MSC [4] checks the status and privileges with the Home Location Register (HLR) [5]. If the mobile [1] is authorized to operate in this cell, the HLR [5] initiates a positive Acknowledgement message (ACK-message), which is sent to the mobile [1], allowing the mobile [1] to camp on the local BS [2] cell and receive services. In case the HLR [5] refuses mobile service in this cell, it will generate a Negative Acknowledgement (NACK-message). Depending on the reason for the NACK-message, the mobile [1] still remains camped on this BS [2] cell, but will either: a) refuse to generate a service request for E911 or b) try to find another BS [2] cell were it does receive a positive Acknowledgement message.

In contrast to the conventional base station serving many users, commonly-owned and co-pending U.S. application Ser. No. 10/280,733, which is incorporated by reference, proposes to use a personal or Private Base Station (PBS) at home or in an office to serve a limited numbered of registered wireless phone users. The subject matter of application Ser. No. 10/280,733 is published in corresponding International Publication No. WO 2004/040938.

The PBS, unlike the conventional base station, is assigned specifically to and/or owned by an individual or organization. The PBS is placed in a location of the owner's choice, such as their home, office, campus, apartment, or airport. It is connected to the Internet through a broadband connection. For reasons of privacy or bandwidth capacity, owners may want to restrict the use of their Private Base Station(s) to selected mobile subscribers of their choice. Therefore, it is necessary to provide a system, apparatus, and method that provides the ability to grant or deny selected mobile phones access to services from a specific (designated) base station. The present invention provides a mechanism to provide such Private Base Station Exclusivity.

SUMMARY OF THE INVENTION

Embodiments of the present invention provide a mechanism by which individual Private Base Stations (PBS) may be configured within wireless carrier networks, either electively (voluntarily) or non-electively (involuntarily), to grant services to selected (authorized) mobile phones and/or deny services to other (unauthorized) mobile phones within the PBS cell. There are many configurations (mechanisms/embodiments) to achieve this function.

One embodiment of the present invention can be viewed as providing one or more of the following elements: a) an Exclusivity Database (EDB) that is located in one of the network devices and stores all or a subset of information about Private Base Stations and the mobile phones selected (authorized) to receive services from specific (designated) Private Base Stations, b) a Grant/Deny Process (GDP) that checks the EDB for and informs selected (authorized) mobile phones that access to services from a specific Private Base Station has been granted or denied, c) an Update/Maintenance Process (UMP) that updates and maintains the Private Base Station EDB by adding or deleting selected (authorized) mobile phones, and d) an Enable Disable Process (EDP) that enables or disables Exclusivity for a specific Private Base Station.

One exemplary embodiment of the Exclusivity Data Base (EDB) is to store cross-referenced mobile phone and PBS identification information, such as the International Mobile Subscriber Identity (IMSI) that identifies mobile phones authorized to receive services from specific Private Base Stations, a Private Base Station Identity (PBSI) that identifies Private Base Stations (and their registered owners), and a Private Base Station Owner Authorization Code (PBSOAC) that allows the carrier to validate whether individuals logging into the EDB have authority to update the list of EDB authorized users for a specific Private Base Station.

The EDB would be configured to reside in one of the existing carrier network devices, such as the Private Base Station, the Base Station Controller, the Mobile Switching Center, or the Home Location Register.

One exemplary embodiment of the Grant/Deny Process (GDP) configuration is to have each mobile phone send a Location Update Request (LUR) containing the International Mobile Subscriber Identity (IMSI) whenever it is tries to roam or login to a specific Private Base Station. The LUR is sent to the EDB. The EDB checks the IMSI to determine if a particular mobile phone is authorized to receive services from the specific Private Base Station. If authorized, the EDB sends a Positive Acknowledgement (ACK) to either the Internet Base Station Controller (BSC) or the Private Base Station (PBS), initiating "normal operation". Normal operation means the iBSC sends the LUR to the Mobile Switching Center/Home Location Register. The HLR translates the IMSI to the mobile telephone number, generates an ACK for this mobile and updates its location in the HLR.

Alternatively, if the EDB finds the mobile is unauthorized, the EDB sends a Negative Acknowledgement (NACK) to either the iBSC or the iBS that will be translated into a Location Updating Reject (LUiR) message with cause #15 or #12. The mobile then leaves the control channel, marks the Private Base Station cell id as blocked, and tries to find another control channel. In case of a NACK, the BSC will not send a LUiR to the MSC. Therefore the remaining network will not be aware that this particular mobile phone has been denied access to services.

One exemplary embodiment of the EDP Update/Maintenance Process (UMP) configuration is to add to or delete authorized mobile phones from the EDB through the Internet. An authorized owner (or representative) of the Private Base Station connects to a carrier web site using an Internet connection. The carrier web site provides a data entry screen that directs (prompts) the owner for their Private Base Station id as well as a pre-established identification code that allows them to update the EDB authorized user mobile phone list. The owner then follows a sequence of written or verbal instructions to complete the data entry screen, entering mobile phone numbers (or other ids such as the IMSI) that are to be added or deleted from the PBS authorized user database. The carrier web site then issues instructions to update the EDB authorized user mobile list, assuming the new mobile phone(s) are registered or authorized to roam on the carrier network.

One exemplary embodiment of the Exclusivity Enable/Disable Process (EDP) configuration for activating or deactivating pre-existing (previously entered) authorized mobile database lists is a manual override switch. A Private Base Station owner toggles a switch located on the Private Base Station. The PBS than contacts the EDB. If the switch on the Private Base Station is toggled to position 1, the base station instructs the carrier to enable the EDB. This causes the Private Base Station to operate in the Exclusive mode, restricting mobile phone service only to authorized users. If the switch on the Private Base Station is toggled to position 2, the Private Base Station instructs the carrier to temporarily disable or deactivate the Private Base Station EDB. This causes the PBS to operate in the non-Exclusive mode, allowing unrestricted access to mobile phone service by all users, as long as the mobile phones are registered or authorized to roam on the carrier network.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the application.

BRIEF DESCRIPTION OF THE DRAWINGS

The foregoing and other systems, methods, features, and advantages of the present invention will be more readily understood upon consideration of the following detailed description of the invention, taken in conjunction with reference to the accompanying drawings. The elements (components) in the drawings are not necessarily to scale, emphasis instead being placed upon clearly illustrating the principles of the present invention and the relationships between the elements. Moreover, in the drawings, like (identical) reference numbers designate corresponding elements (components) consistently in the multiple figures or diagrams.

FIG. 1 is a block diagram of the devices employed within a conventional wireless carrier network.

FIG. 2 is a block diagram of devices and processes required to implement Exclusivity in a wireless carrier network with a Private Base Station. FIG. 2 identifies devices with numbers and processes with alphabetical letters.

DETAILED DESCRIPTION OF THE PREFERRED EMBODIMENTS

Introduction

U.S. application Ser. No. 10/280,733, filed Oct. 25, 2002 and having common assignee, proposes a portable, low power base station configured to convey wireless traffic between a mobile base station and a conventional wireless network via the Internet. The base station may be referred to as a "personal" or "private" base station ("PBS"), and is configured to connect to the Internet at a user-selected location and establishes a small area of wireless coverage within a greater macrocell network. The user sets the operating parameters of the base station. U.S. application Ser. No. 10/280,733 is incorporated by reference, and its subject matter has been published in corresponding International Publication No. WO 2004/040938.

1.0 Implementing Exclusivity

FIG. 2 is a high level diagram of an exemplary embodiment of a wireless communications network according to the present invention. The diagram illustrates the relationship between the Private Base Station (PBS) [2] and other elements (devices, and processes) within the network that are needed in order to provide Exclusivity. FIG. 2 identifies devices with numbers and processes with alphabetical letters. Exclusivity requires one or more of the following elements: a) an Exclusivity Database (EDB) [6] that is located in one of the network devices and stores all or a subset of information about Private Base Stations [2] and the mobile phones [1] selected (authorized) to receive services from specific (designated) Private Base Stations, b) a Grant/Deny Process (GDP) [b] that checks the EDB for and informs selected (authorized) mobile phones that access to services from a specific Private Base Station has been granted or denied, c) an Update/Maintenance Process (UMP) [c] that updates and maintains the Private Base Station EDB by adding or deleting selected (authorized) mobile phones, and d) an Enable/Disable Process (EDP) [d] that enables or disables Exclusivity for a specific Private Base Station.

1.1 Exclusivity Database (EDB) Contents and Location

In order to provide Exclusivity, the present invention requires an Exclusivity Database (EDB) [6] that is located in one of the network devices and stores all or a subset of information about Private Base Stations, about mobile phones selected (authorized) to receive services from designated (specific) Private Base Stations, and about individuals (PBS owners or designated representatives) authorized to change the EDB list of authorized users (mobile phones) for a specific Private Base Station.

One exemplary embodiment of the Exclusivity Data Base (EDB) is to store cross referenced mobile phone and Private Base Station identification information, such as the International Mobile Subscriber Identity (IMSI) that identifies mobile phones authorized to receive services from specific PBS, a Private Base Station Identity (PBSI) that identifies Private Base Stations (and their registered owners), and a Private Base Station Owner Authorization Code (PBSOAC) that allows the carrier to validate whether individuals logging into the EDB have authority to update the list of authorized users for a specific Private Base Station. In a similar embodiment, instead of storing the IMSI within the EDB to identify authorized mobile phones for a specific PBS, mobile phone numbers would be stored within the EDB.

Another embodiment is to store within the EDB the names, social security numbers, and other identifying features such as mother's maiden name that allows the carrier to validate whether individuals logging into the EDB have authority to update the list of EDB authorized users for a specific Private Base Station.

Another embodiment is to store within the EDB the PBS owners name and an associated password that allows the carrier to verify whether individuals logging into the EDB have authority to update the list of EDB authorized users for a specific PBS.

Another embodiment is to store within the EDB enabling authorization codes assigned to specific Private Base Stations that allows the carrier to validate whether individuals logging into the EDB have authority to update the list of EDB authorized users for a specific PBS.

In order to provide Exclusivity, the EDB may be configured to reside in one of the existing carrier network devices or some other network device:

An exemplary embodiment configures the EDB to reside in the PBS [2].

Another embodiment configures the EDB to reside in the Base Station Controller (BSC) [3].

Another embodiment configures the EDB to reside on the Mobile Switching Center (MSC) [4].

Another embodiment configures the EDB to reside on the Home Location Register (HLR) [5].

Another embodiment configures the EDB to reside in an entirely new network device [not shown in FIG. 2].

Another embodiment configures (programs) a Subscriber Identify Card (SIM) card of a mobile phone [1] with a subset of EDB information that would allow the mobile phone to access services from a specified Private Base Stations. This would be done by assigning the Private Base Station Network a new Public Land Mobile Network (PLMN) code. Only selected (authorized) mobile phones with EDB SIM card programming would be allowed to roam to Private Base Station networks using the new PLMN code.

1.2 Exclusivity Grant/Deny Process (GDP)

In order to provide Exclusivity, the present invention requires a Grant/Deny Process (GDP) [b] that checks the EDB [6] for and informs selected (authorized) mobile phones that access to services from a specific Private Base Station has been granted or denied.

One exemplary embodiment of the Grant/Deny Process (GDP) configuration is to have each mobile phone send a Location Update Request (LUR) containing the International Mobile Subscriber Identity (IMSI) whenever it is tries to roam or login to a specific Private Base Station. The LUR is sent to the EDB. The EDB checks the IMSI to determine if a particular mobile phone is authorized to receive services from the specific Private Base Station. If authorized, the EDB sends a Positive Acknowledgement (ACK) to either the Internet Base Station Controller (BSC) [3] or the Private Base Station (PBS) [2], initiating "normal operation". Normal operation means the iBSC sends the LUR to the Mobile Switching Center (MSC) [4] and Home Location Register (HLR) [5]. The HLR translates the IMSI to the mobile telephone number, generates an ACK for this mobile and updates its location in the HLR.

Alternatively, if the EDB finds the mobile is unauthorized, the EDB sends a Negative Acknowledgement (NACK) to either the BSC or the PBS that will be translated into a Location Updating Reject (LUiR) message with cause #15 or #12. The mobile then leaves the control channel, marks the Private Base Station cell id as blocked, and tries to find another control channel. In case of a NACK, the BSC will not send a LUiR to the MSC. Therefore the remaining network will not be aware that this particular mobile phone has been denied access to services.

In case an authorized mobile moves from its original home PBS cell to another neighboring (new) PBS cell that has the same Location Area Identity (LAI), the mobile will receive a LUiR because the mobile is not authorized to receive services in this new PBS cell. The current GSM system instructs the mobile to store the LAI (in this case the LAI for its own home PBS cell) in the SIM card as "Location Area not allowed", when the LUiR message with cause #15 is received.

In order to avoid this inter-cell movement problem, one embodiment of this invention is to define a new NACK reason message that instructs the mobile to look for another cell instead of storing its home PBS cell/LAI as "not allowed".

In order to avoid this inter-cell movement problem, another embodiment of the invention enables the network (pBS, iBSC or SIM) to use either the SIM tool kit or the OTA (Over The Air) function for the purpose of deleting the original home PBS ell in case the mobile is authorized in another cell with the same LAI. After the mobile has received the LUiR message and stores it in its SIM card, the network then sends either an SMS or other data to the mobile. instructing the SIM to delete this cell from its memory. Therefore, when the mobile returns (moves back) to its home PBS cell, the mobile will start a LUP, and allowing it to be accepted in its original home cell.

One embodiment for avoiding this inter-cell movement problem uses the SIM Tool kit. The SIM Tool technology enables easy access to value added services on GSM mobile phones. With the SIM Toolkit, the SIM card can be programmed with applications that can be heard or seen on the mobile. These applications can be entirely defined by the operator to function autonomously, and/or additional menus can be installed by the SIM on the handset for remote control by the wireless carrier. In the case of remote control by the carrier, the operator can either download or remove applications from the SIM. Alternately the SIM can be programmed to function autonomously. In either case, the SIM can be activated by data sent from the network to the handset. Through SMS data messages, all mobiles in particular cell area, or on a card by card basis, can receive data for updating applications or files on their SIM card in order to correct the inter-cell movement problem.

Another embodiment for avoiding this inter-cell movement problem uses the Over-the-Air technology (OTA). Over-the-Air technology (OTA) is useful in updating and changing data in the SIM without having to reissue another SIM. OTA is based on a client/server architecture. On one side is a provisioning system (application and card database) and on the other is a SIM card accessible via an SMS channel. Examples of OTA services are SIM activation, SIM administration, applet diffusion and configuration, etc.

Another embodiment of the Grant/Deny Process (GDP) configuration is similar to the one described above. However, instead of generating the NACK-message in the EDB, the NACK-message is generated in the PBS [2].

Another embodiment of the Grant/Deny Process (GDP) configuration is similar to the one described above. However, instead of generating the NACK-message in the PBS, the NACK-message is generated in the BSC [3].

Another embodiment of the Grant/Deny Process (GDP) configuration is similar to the one described above. However, instead of generating the NACK-message in the PBS, the NACK-message is generated in the MSC [4].

Another embodiment of the Grant/Deny Process (GDP) configuration is similar to the one described above. However, instead of generating the NACK-message in the MSC, the NACK-message is generated in the HLR [5].

Another embodiment of the Grant/Deny Process (GDP) configuration would be to configure (program) the Subscriber Identify Card (SIM) card of a particular mobile phone [1] with a subset of EDB information that would allow the mobile phone to access services from specified Private Base Stations. This would be done by assigning the Private Base Station Network a new Public Land Mobile Network (PLMN) code. Only selected (authorized) mobile phones with EDB SIM card programming would be allowed to roam to Private Base Station networks assigned the new PLMN code.

Another embodiment of the Grant/Deny Process (GDP) configuration would be to configure (program) the Subscriber Identify Card (SIM) card of a particular mobile phone [1] with a list of allowed Public Base Stations that would allow the mobile phone to access services from these specified Private Base Stations.

1.3 Update/Maintenance Process (UMP)

In order to provide Exclusivity, the present invention requires an Update/Maintenance Process (UMP) [c] that updates and maintains the EDB [6] by adding selected (authorized) or deleting selected (unauthorized) mobile phones [1] from the database. It is anticipated that the carriers will prefer Private Base Station [2] owner and individual mobile subscribers be responsible for updating and maintaining the EDB.

One exemplary embodiment of Update/Maintenance Process (UMP) is an automatic timeout. Following a specified period of inactivity (e.g. 2 months) by an authorized mobile phone, an automatic timeout instructs the carrier system to delete that mobile phone from EDB.

Another embodiment of the UMP is manual data entry via a fixed or mobile handset. An authorized owner of the PBS contacts an automated call center using either a fixed line or mobile phone. If the contact is made through the PBS, the automated call center identifies the PBS and the mobile phone. If the contact is not made through the Private base station, the automated call center prompts the caller for their PBS id and a pre-established identification code that allows the owner to update the EDB of authorized users database for their PBS. The owner then follows a sequence of written or verbally prompted instructions enabling the entry of mobile phone numbers (or other ids) that are to be added or deleted from the EDB of authorized users. The automated call center then issues instructions to carrier system to update the EDB of authorized users for the designated PBS, assuming the new mobile number is a registered carrier subscriber or is authorized to roam on the carrier network. The call center could allow the owner to: delete one or more mobile numbers, add one or more mobile numbers in long-term mode (perhaps for household members), add one or more mobile numbers in visitor-mode (e.g. for the next 24 hours or timeout after e.g. 24 hours), add one or more mobile numbers in friends-mode (timeout after e.g. 3 months).

Another embodiment of the UMP is similar to the manual data entry via a fixed or mobile handset described above. However, instead of contacting an automated call center, live operators are contacted.

Another similar embodiment of the UMP is manual data entry via a mobile handset and subsequent SMS transmission. However, instead of contacting an authorized call center, the user follows a set of hardcopy written instructions, or follows a set of instructions displayed on their mobile handset screen (if available). The instructions direct (prompt) the user to enter their mobile handset phone number (or the handset may identify the phone number automatically), then direct (prompts) the user to enter a pre-established activation code for a particular PBS. After entering this data, the information is stored in the handset and then forwarded to the carrier via a Short Message Service (SMS) communication. After receiving the SMS communication, the carrier then issues instructions to update EDB of authorized users for the designated PBS, assuming the new mobile number is a registered carrier subscriber or is authorized to roam on the carrier network.

Another embodiment of the UMP is manual data entry through the Internet, or a data link to the PBS, BSC [3] or EDB. An authorized owner of the PBS connects to a carrier web site using an Internet connection, or the data link to the BSC or PBS. The carrier web site provides a data entry screen that directs (prompts) the caller for their Private base station id as well as the owners a pre-established identification code that allows the owner to update the authorized user, database for the designated base station. The owner then follows a sequence of written or verbal instructions to complete the data entry screen entering mobile phone numbers (or other ids) that are to be added or deleted from authorized user database. The carrier website then issues instructions to update the EDB of authorized users for the designated PBS, assuming the new mobile number is a registered carrier subscriber or is authorized to roam on the carrier network.

Another embodiment of the UMP is manual data entry of an activation code using a fixed line or mobile phone. A user contacts an automated call center using either a fixed line or their mobile phone. If the contact is made using their mobile phone, the automated call center identifies the mobile phone number and maybe no activation code is needed. If the contact is not made through the users mobile phone, the automated call center prompts the caller for their mobile phone number and a base station identification, which the user enters. The mobile owner is then prompted for a pre-established activation code, which, when entered, causes the automated call center to issue instructions to the carrier system to update the EDB of authorized users for the designated PBS, assuming the new mobile number is a registered carrier subscriber or is authorized to roam on the carrier network.

Another similar embodiment of the UMP is manual entry of an activation code via a mobile handset and subsequent SMS or other data transmission. However, instead of contacting an authorized call center, the user follows a set of hardcopy written instructions, or follows a set of instructions displayed on their mobile handset screen (if available). The instructions direct (prompt) the user to enter their mobile handset phone number (or the handset may identify the phone number automatically), then direct (prompts) the user to enter a pre-established activation code for a particular PBS. After entering this data, the information is stored in the handset and then forwarded to the carrier via a Short Message Service (SMS) communication. After receiving the SMS communications, the carrier then issues instructions to update the EDB of authorized users for the designated PBS, assuming the new mobile number is a registered carrier subscriber or is authorized to roam on the carrier network.

Another embodiment of the UMP is simultaneous (synchronized) base station trigger activation and mobile handset activation. A PBS owner activates a trigger button located on the Private Base Station. Simultaneously, within a window of prescribed time (e.g. 60 seconds), a mobile user activates (turns on) their mobile handset within the cell of the designated Private base station. The mobile then will automatically try to register to the network through the PBS. The mobile number or the IMSI will be stored. After receiving the communication from the Private Base Station, the carrier then issues instructions to update the EDB of authorized users for the designated PBS, assuming the new mobile number is a registered carrier subscriber or is authorized to roam on the carrier network.

1.4 Enable/Disable Process (EDP)

An optional element to enhance Exclusivity usability is to provide an Enable/Disable Process (EDP) [d] that enables or disables Exclusivity for a specific Private Base Station.

One exemplary embodiment of Enable/Disable Process (EDP) is an automatic method for activating or deactivating pre-existing (previously entered) authorized user database lists using a manual override switch. A Private Base Station (PBS) [2] owner toggles a switch located on the PBS. The PBS than contacts the EDB. If the switch on the PBS is in the "private" position, the base station instructs the carrier to maintain or activate the base station authorized user database. This causes the PBS to operate in an exclusive mode, excluding mobile phone use by non-authorized users. If the switch on the PBS is in the "public" position, the base station instructs the carrier to disable or deactivate the EDB authorized user database. This causes the base station to operate in a nonexclusive mode, allowing mobile phone use by all users, as long as the mobile phones belong to registered carrier subscribers.

Another similar embodiment of Enable/Disable Process (EDP) to that described above using a manual override switch is to toggle the switch remotely by entering a sequence of instructions using a master mobile (or other household mobile) phone assigned to a specific Private Base Station.

Another embodiment of the invention is to use the switch information in the PBS without sending a message to the EDB. In this case the EDB for this PBS is simply ignored as long as the switch is in the "public" position.

Another embodiment of the invention is to use the internet, or direct data link to the PBS [2], BSC [3], or EDB [6] to communicate the Enable/Disable Process.

2.0 Applicable Technologies

Although many of the embodiments of the current invention described above are based upon GMS technology, the invention however supports other technologies, including CDMA, iDEN and 3G/UMTS as well.

Communications by the base station with carrier network my be accomplished using a number of technologies. The Internet as a backhaul is one embodiment, but other embodiments apply as well, including dedicated lines such as T1 and analog lines.

The scope of the invention also applies to embodiments using pico, micro or macro cells used in apartment, public areas, businesses, campuses, airports, or where exclusivity is used for employees, special groups, visitors, or other designated individuals.

3.0 Conclusion

In conclusion, it should be emphasized that the above-described embodiments of the present invention, particularly, any "preferred" embodiments, are merely possible examples of implementations, merely set forth for a clear understanding of the principles of the invention. Many variations and modifications may be made to the above-described embodiments of the invention without departing substantially from the spirit and principles of the invention. All such modifications or variations are intended to be included herein within the scope of this disclosure and the present invention.

The invention claimed is:

1. A method comprising:
   allowing registered mobile phones to use services within a cell of wireless coverage established by a private base station (PBS) connected to the Internet, wherein the PBS functions within a larger wireless network to provide services only to the registered mobile phones and to deny services to unregistered mobile phones; and
   denying use of the services from the PBS by an unregistered mobile phone by providing a negative acknowledgement (NACK) response to the unregistered mobile phone to indicate denial of services from the PBS and not sending a reject message to a Mobile Switching Center (MSC) that would indicate the unregistered mobile phone has been denied access to services via the PBS, wherein the NACK response causes the unregistered mobile phone mark the PBS as blocked and to find another control channel rather than using the PBS as its home cell.

2. A method as claimed in claim 1, wherein an exclusivity database, a grant/deny process and an update/maintenance process are used to allow mobile phones to register for use of services within the cell.

3. A method as claimed in claim 2, wherein a denial portion of the grant/deny process comprises generating a negative acknowledgement (NACK) message in the PBS, base station controller or the exclusivity database and sending the NACK message to a mobile phone indicating that the mobile phone is not allowed use of services in the cell.

4. A method as claimed in claim 3, and further comprising:
   sending an OTA message to mobile phones that have received a NACK message so that a cell-ID can be deleted from the mobile phone and the phone can camp on another PBS.

5. A method as claimed in claim 2, and further comprising:
   storing IMSI information in the exclusivity database to identify registered mobile phones.

6. A method as claimed in claim 2, and further comprising:
   storing personal information of an owner of the PBS in the exclusivity database for validation purposes, the personal information selected from a group comprising a social security number; a mother's maiden name; an owner authorization code; a user name; and a password.

7. A method as claimed in claim 2, wherein the exclusivity database is implemented in the PBS, a base station controller, a mobile switching center or a home location register.

8. A method as claimed in claim 2, and further comprising:
   allowing an owner of the PBS to register mobile phones via the Internet.

9. A method as claimed in claim 2, and further comprising:
   allowing an owner of the PBS to call a call center to register mobile phones.

10. A method as claimed in claim 2, and further comprising:
    allowing an owner of the PBS to send an SMS to register mobile phones.

11. A method as claimed in claim 2, and further comprising:
    programming mobile phones via SIM cards to allow the mobile phones to camp on cells of certain PBSs.

12. A method as claimed in claim 11, wherein the SIM cards are pre-programmed when provided to the subscriber or are programmed by network messages using a SIM toolkit.

13. A method as claimed in claim 2, and further comprising:
deregistering mobile phones based on a timeout period of inactivity.

14. A method as claimed in claim 1, and further comprising:
filtering location update messages with a base station controller before forwarding the messages to a mobile switching center so that messages from registered mobile phones are passed to the mobile switching center and messages from unregistered mobile phones are not passed to the mobile switching center.

15. A private base station (PBS) configured to connect to the Internet and establish a small area of wireless coverage, wherein the PBS functions within a larger wireless network to provide services only to the registered mobile phones and to deny services to unregistered mobile phones, the PBS comprising:
an interface to couple the PBS with the Internet;
an exclusivity database allowing registered mobile phones to use services within a cell provided by the PBS and not allowing use of the services by an unregistered mobile phone by providing a negative acknowledge (NACK) response to the unregistered mobile phone and not sending a reject message to a Mobile Switching Center (MSC) that will not indicate to a Mobile Switching Center (MSC) that the unregistered mobile phone has been denied access to services via the PBS, wherein the NACK response causes the unregistered mobile phone mark the PBS as blocked and to find another control channel rather than using the PBS as its home cell.

16. A PBS as claimed in claim 15, and further comprising a switch for enabling the exclusivity database.

17. A PBS as claimed in claim 15, and further comprising a switch for enabling the ability of registration of mobile phones.

18. A PBS as claimed in claim 15, and further comprising a trigger for allowing a mobile phone to register for a limited time.

* * * * *